United States Patent [19]

Ford et al.

[11] Patent Number: 5,287,993
[45] Date of Patent: Feb. 22, 1994

[54] HOPPER AGITATOR

[75] Inventors: David F. Ford; Cindy J. S. Lord, both of Springfield, Ill.

[73] Assignee: Bunn-O-Matic Corporation, Springfield, Ill.

[21] Appl. No.: 942,625

[22] Filed: Sep. 9, 1992

Related U.S. Application Data

[63] Continuation-in-part of Ser. No. 851,512, Mar. 16, 1992.

[51] Int. Cl.$^5$ ............................................. G01F 11/00
[52] U.S. Cl. ................................. 222/135; 222/236; 222/413; 366/327; 366/329
[58] Field of Search ............... 222/148, 231, 236, 413, 222/135; 366/186, 195, 196, 295, 309, 327, 329

[56] References Cited

U.S. PATENT DOCUMENTS

| | | | |
|---|---|---|---|
| 1,717,478 | 6/1929 | Vilas | 366/309 |
| 3,013,701 | 12/1961 | Joschko | 222/236 |
| 3,354,811 | 11/1967 | King | 99/282 |
| 4,100,615 | 7/1978 | Thompson | 366/295 |
| 4,493,249 | 1/1985 | Stover | 99/275 |
| 4,665,808 | 5/1987 | Pulvermuller | 99/285 |

*Primary Examiner*—Andres Kashnikow
*Assistant Examiner*—Philippe Derakshani
*Attorney, Agent, or Firm*—Trexler, Bushnell, Giangiorgi & Blackstone, Ltd.

[57] ABSTRACT

A hopper assembly for storing and controllably dispensing ground material such as coffee meal. The hopper assembly includes a hollow body portion positioned above and in communication with a dispensing assembly. A storage chamber is formed between the hollow body portion and the dispensing assembly. A wall extends between a top end and a base end of the body portion. The body portion is frustoconical shaped such that the top end is smaller in diameter than the base end and the wall tapers inwardly from the base end toward the top end. The frustoconical shape of the body portion prevents bridging of the material retained in the storage chamber. An agitating device is also included in the dispensing assembly for creating a stirring action and moving material in the storage chamber to further prevent clogging and bridging of the material. At least a portion of the hopper assembly is formed of a transparent material to allow light to pass therethrough. An ambient light sensor is provided and positioned proximate to the transparent portion of the hopper assembly for detecting ambient light inside the storage chamber. The ambient light sensor detects the level of material in the storage chamber by sensing the amount of ambient light entering the transparent portion of the hopper assembly.

4 Claims, 2 Drawing Sheets

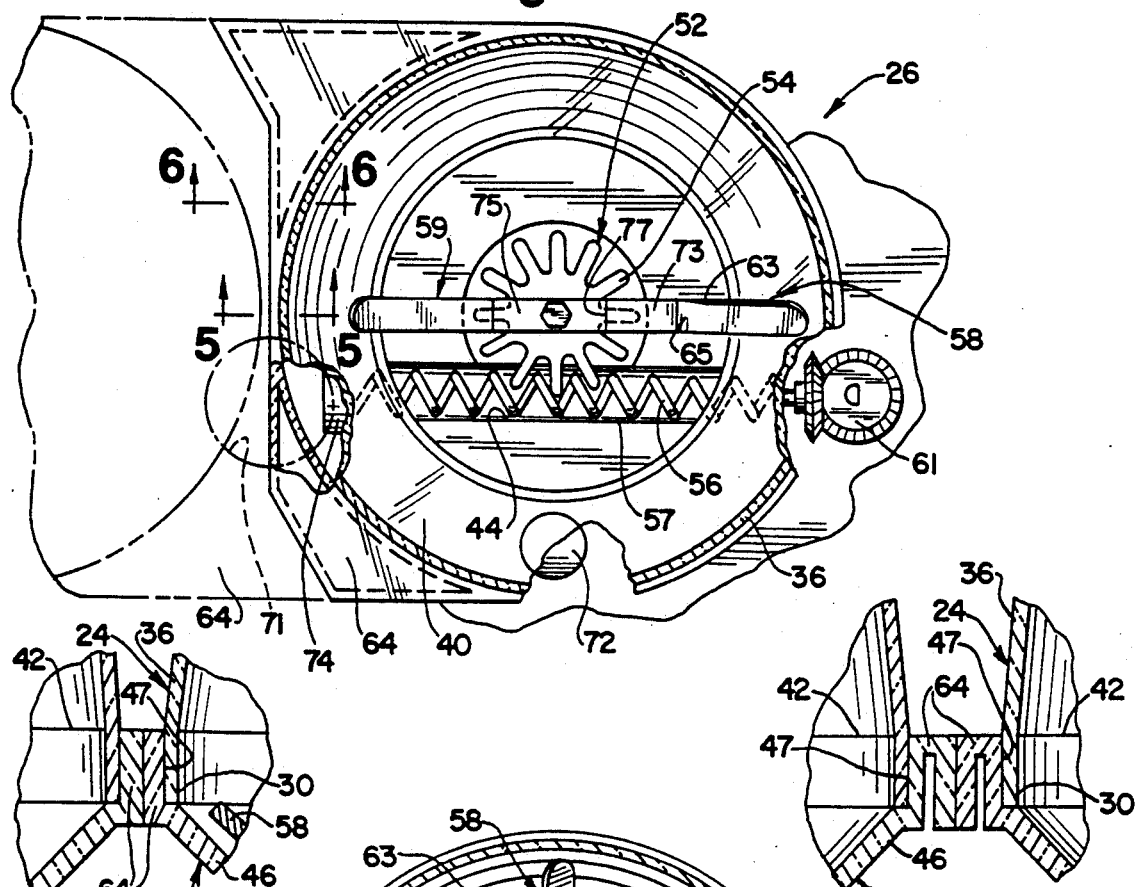
Fig. 3
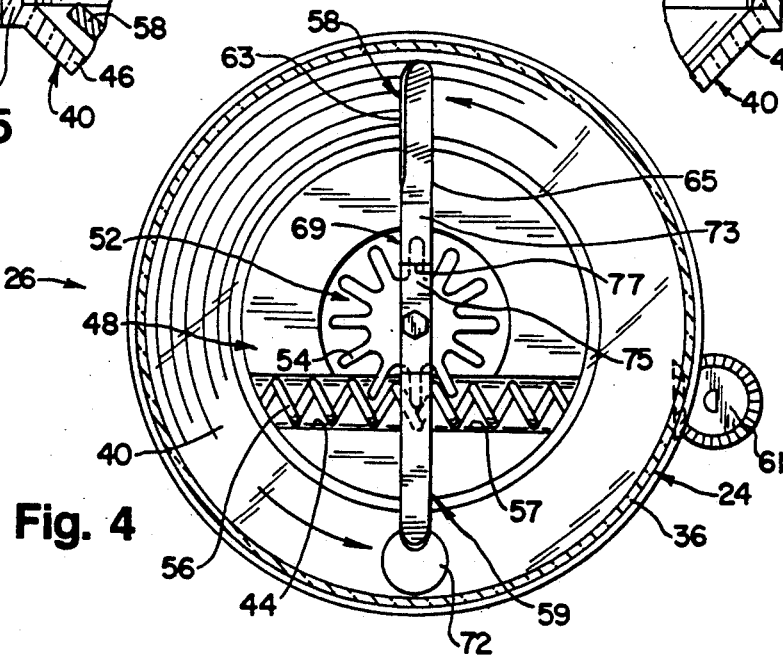
Fig. 5
Fig. 4
Fig. 6

HOPPER AGITATOR

BACKGROUND OF THE INVENTION

The present application is a continuation in part of U.S. patent application Ser. No. 07/851,512 filed Mar. 16, 1992.

The present application pertains to devices for agitating a hopper portion of a material delivery apparatus and for sensing the volume condition of the material retained in the hopper portion.

A variety of beverage brewing apparatus have been developed in order to brew beverages with a minimum of human intervention. Such apparatus include automatic brewing chambers as well as the means for delivery of a beverage brewing substance to such a chamber and the removal therefrom. One example of such a beverage brewing apparatus is shown in U.S. Pat. No. 5,134,925, issued Aug. 4, 1992, to Bunn et al. In the Bunn et al. device, beverage brewing substance is retained and precisely delivered to the brewing chamber for infusion with heated water to produce a brewed beverage. Spent coffee meal is automatically removed from the brewing chamber at the end of each brewing cycle.

A material delivery apparatus is shown in Bunn et al. which includes storage hoppers and delivery augers. Beverage brewing substance, such as ground coffee meal, is stored in the storage hoppers for delivery to the brew chamber upon demand by controlled rotation of the auger. While the material delivery apparatus as shown in Bunn et al. is effective in delivering a precise quantity of beverage brewing substance, it would be advantageous to provide a material delivery apparatus which would agitate the material stored therein. Agitation and vibration is advantageous because it promotes the downward movement of the beverage brewing substance, including fines and powders which may be a part of the substance, towards the output port of the material delivery apparatus.

A device as shown in U.S. Pat. No. 3,354,810 to King, issued Nov. 28, 1967, shows a material delivery apparatus similar to the device as shown in Bunn et al. with the addition of an agitating device retained in the storage hopper. The device as shown in King employs a gear wheel having multiple teeth in operative association with the auger. Arm members are attached to the gear. Rotation of the auger to dispense material from the hopper causes the gear, and attached arms to rotate. Rotation of the arms through the beverage brewing substance breaks up any lumps which might tend to form therein.

The device in King, however, has a problem in that the device does not prevent "bridging" or "doming" of the brewing substance between the hopper walls. Bridging and/or doming results when material is removed from the center of a volume of material. When the material above the rotating arms, as shown in King, and in contact with the side walls, is removed by the rotating arms a free-standing arch or dome is formed above the rotating arms. Such bridging results when there is sufficient contact and force between the side walls to support the weight of the arch or dome. Therefore, even when rotating arms are employed problems may develop with the flow of material through the storage hoppers. Bridging and doming prevents the even flow of material and requires manual manipulation to knock the material suspended in a bridge into the lower portion of the hopper. The agitator in King does not solve this problem and may, in fact cause the problem. The arms tend to under cut the volume of substance thereby, actually causing the formation of a sufficiently pack volume of substance.

Additionally, it would be advantageous to provide a way to determine when the level of the beverage brewing substance in the hoppers is depleted to a predetermined "low level". In other words, as beverage brewing substance is dispensed from the hoppers it would be advantageous to have some form of signal such as an indicator light, to identify when the predetermined "low-level" exists. Indication of such a low level permits refilling of the hopper before they are emptied. If a hopper is not refilled before it is emptied, the brew cycle in which the last remaining portion of the beverage brewing substance is used may not receive a full portion of substance, or no substance at all, resulting in the beverage brewed during such a cycle being of inferior quality.

The device as shown in U.S. Pat. No. 4,665,808 to Pulvermuller, issued May 19, 1987, shows a photocell and some form of light-emitting device used to sense the level of substance in a hopper. The device in Pulvermuller positions a photocell at one corner of a storage hopper and a light-emitting device at a diagonally opposite corner. Light is emitted from the light emitting device and received by the photocell. When a volume of brewing substance is in the hopper, the beam path between the light-emitting device and the photocell is obstructed thereby indicating that there is a brewing substance in the hopper. When the level of the substance in the hopper reaches a predetermined low-level, the beam path is not obstructed thereby indicating that the predetermined low level condition exists.

A problem arises with the device in Pulvermuller such that operation of the level sensor depends upon the light-emitting device. This is a problem because if the light-emitting device fails or is somehow obstructed, the sensor will sense a full condition. Further, this arrangement requires the use of multiple components thereby increasing the cost, material handling, repair as well assembly time, materials and effort. It would be highly advantageous to provide a sensing device which only utilizes a sensing device and eliminates the need for a light-emitting device.

OBJECTS AND SUMMARY OF THE INVENTION

A general object of the present invention is to provide a material delivery apparatus which promotes the downward movement of beverage brewing meal, fines, and powder stored and delivered from a storage hopper of the apparatus.

Another object of the present invention is to provide a material delivery apparatus which senses a low material condition in the hopper by sensing ambient light entering a storage hopper.

Still another object of the present invention is to provide a material delivery apparatus having storage hoppers which are shaped to eliminate bridging of the material therein.

Yet another object of the present invention is to provide a material delivery apparatus having a material agitating device which promotes movement of beverage brewing material away from the walls of the storage hopper.

Briefly, and in accordance with the foregoing, the present invention comprises a hopper assembly for use with a material delivery apparatus which stores and controllably dispenses ground material such as coffee meal. The hopper assembly includes a hollow body portion positioned above and in communication with a dispensing assembly. A storage chamber is formed between the hollow body portion and the dispensing assembly. The body portion has a top end and a base end and a wall extending therebetween. The body portion is frustoconical shaped such that the top end is smaller in diameter than the base end and the wall tapers inwardly from the base end upwardly toward the top end. Bridging is prevented by the inwardly tapered frustoconical shape of the body portion. The dispensing assembly also includes an agitating device for creating a stirring action and moving material in the storage chamber to further prevent clogging and bridging of the material. The agitating device has two rotating arms which create a wiping action close to the walls of the storage hopper and a blending action of the contents of the storage hopper at a distance spaced away from the wall. At least a portion of the hopper assembly is formed of a transparent material permitting light to pass therethrough. An ambient light sensor is positioned proximate to the transparent portion of the hopper assembly for detecting ambient light inside the storage chamber. The ambient light sensor detects the level of material in the storage chamber by sensing the amount of ambient light entering the transparent portion of the hopper assembly.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 3 is a partial fragmentary cross sectional top plan view taken along line 3—3 in FIG. 1 through one of the storage hopper assemblies showing the agitating device and an interlocking flange extending around and between the two body portions;

FIG. 4 is a partial fragmentary cross sectional top plan view of the present invention showing rotation of rotating arms of the agitating device positioned inside a funnel portion of the storage hopper assembly;

FIG. 5 is a partial fragmentary cross sectional view taken along line 5—5 in FIG. 3 showing an abutting portion of the interlocking flange; and FIG. 6 is a partial fragmentary cross sectional view taken along line 6—6 in FIG. 3 showing a portion of the interlocking flange with relief areas formed therein.

DETAILED DESCRIPTION OF THE ILLUSTRATED EMBODIMENT

Figure 1:
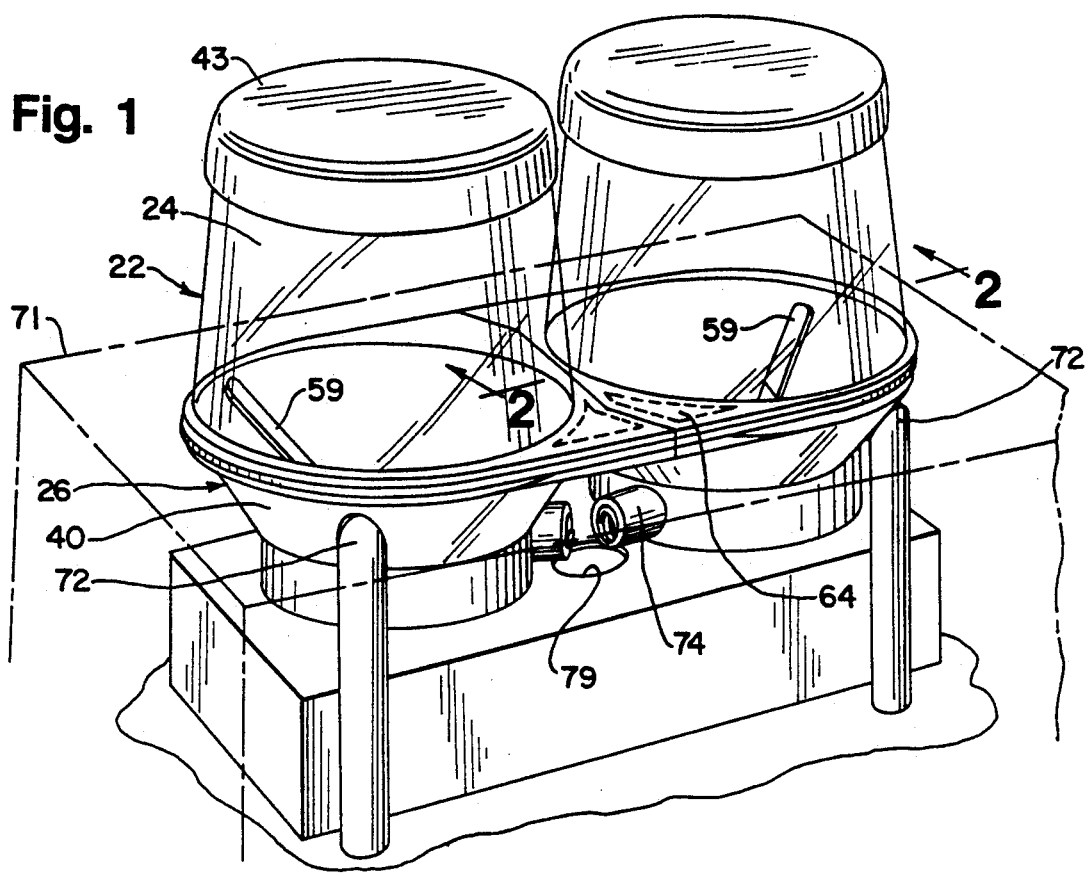
FIG. 1 is a perspective view of a material delivery apparatus of the present invention with two storage hopper assemblies having a frustoconical shaped body portions.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Referring now to the drawings, wherein like parts are designated by the same reference numerals throughout the figures, a material delivery apparatus 20 in accordance with the present invention is shown in FIG. 1. The material delivery apparatus 20 includes at least one hopper assembly 22. As shown in FIG. 1, two hopper assemblies 22 are provided.

The hopper assemblies 22 include a hollow body portion 24 which is retained on top of a dispensing assembly 26. With additional reference to FIG. 2, the hollow body portion 24 has a frustoconical shape oriented with a smaller top end 28 positioned above a larger base 30. An upper dimension 32 measured as a diameter across the body portion 24 is smaller than a base dimension 34 measured across the base end 30 of the body portion 24. A wall 36 extends between the base end 30 upwardly toward the top end 28 and tapered inwardly at an inclination angle 38 of 3° to 10°. The tapered wall 36 terminates in a filling aperture 39 having an opening dimension 41 which is less than or equal to the upper dimension 32. A cover 43 fits over the upper end of the wall 36 to cover the filling aperture 39 to prevent contamination of the material retained in the hopper assembly 22.

The inwardly sloped wall 36 defining the frustoconical shape helps to eliminate material bridging between the walls of the hopper assembly 22. The inwardly sloped wall 36 helps to prevent material retained in the hopper assembly 22 from forming a bridge or a dome over the dispensing assembly 26. The inclination angle 38 may be adjusted depending on the type of material retained in the hopper assembly 22 so that the material tends to continually fall inwardly upon itself and also minimizes interaction with the wall 36 in a compacting or bridging fashion.

The dispensing assembly 26 includes a funnel portion 40 having an open mouth 42 positioned above a bore exit port 44. Walls 46 of the funnel portion 40 slope upwardly and outwardly from the exit port 44 toward the mouth 42. A mating channel 47 is formed along the mouth 42 for receiving the base end 30 of the body portion 24. A storage chamber 49 is defined by the area contained inside the hollow body portion 24 and the funnel portion 40.

The dispensing assembly 26 also includes a multiaction agitating device 48 and a dispensing device 50. With further reference to FIGS. 3 and 4, the agitating device 48 and the dispensing device 50 interact and are operatively coupled by way of a drive gear 52 which has extending teeth 54 engaging the helix of an auger 56 of the dispensing device 50. Drive means 47 coupled with the drive gear rotates the auger 56 to transfer a force to the gear teeth 54 of the gear 52 thereby rotating a wiping arm 58 and a blending arm 59 of the multiaction agitating device 48 attached to the gear 52. The auger 56 is driven by drive means 60 shown as including a pair of bevel gears 61 in FIGS. 2, 3 and 4. Rotation of the auger 56 in an auger sleeve 57, which communicates with the funnel portion 40 by means of the exit port 44, dispenses coffee from the hopper assembly 22.

The multiaction agitating device 48 includes a base segment 75 which is operatively attached to the rotating means 45 by way of the gear 52. Rotation of the agitating device 48 stirs and moves the material which might otherwise compact against the walls 46 of the funnel portion 40. The wiping arm 58 extends upwardly along the wall 46 in close relation thereto so as to provide thorough separation of material from the walls 46 during an agitating process. An end portion of the wiping arm defines a wiping span 63 which is blade shaped and has a spiral twist 65. The weight of coffee on the spirally twisted portion 65 improves the wiping action of the wiping arm 58 against the inside surface 65 of the wall 46.

The blending arm 59 extends upwardly spaced away from the wall 46 for creating an agitating action in the body of material spaced away from the walls. The blending arm 59 prevents the body of material spaced away from the walls from compacting and interacting and thus helps prevent bridging. Since material cannot compact against the walls 46 or the funnel portion 40, the formation of bridging or doming of material over the dispensing assembly is further prevented.

A stepped portion 69 of the wiping arm 58 provides additional flexibility for biasing the spirally twisted portion 63 against the inside surface 67 of the wall 46 and provides additional agitating action in the storage hopper. A horizontal span 73 of the wiping arm 58 cuts through the material in the hopper at a different level than a horizontal span 75 of the blending arm 59. Further, a vertical span 77 of the wiping arm 58 agitates a central columnlar area of the hopper. The combined actions of the components of the agitating device 48 assure that bridging or doming of material is prevented.

The funnel portions 40 of the two adjacent hopper assemblies 22 shown in FIG. 1 have an interlocking flange 64 extending therefrom and cooperating to close the area between the hoppers 22. A housing 71 (shown in phantom line) surrounding the hopper assemblies 22 is formed with a single obround opening 70 through which the hopper assemblies 22 project. The obround opening 70 is slightly larger than a corresponding perimeter of the hopper assemblies and positioned at the same height as the flanges 64. A flexible seal 68 lines the obround opening 70 and presses against the hoppers to keep the flanges 64 in an interlocking arrangement. Engagement of the interlocking flange portion 64 provides a means of sealing the interior of the housing 69 against foreign material. As is shown in FIG. 3, when the interlocking flange portions 64 are engaged they cover or shield a filling aperture 79 of the material delivery apparatus 20.

The walls 36, 46 of the body portion 24 and funnel portion 40 are formed of a material which permits light to be transmitted therethrough. While the material as shown in the figures is transparent, the material used in forming the body portion 24 and the funnel portion 40 may be light transmitting but not necessarily fully transparent. Use of a light transmitting material is important for the functioning of an additional element of the present invention.

As shown in FIGS. 1, 3 and 4, ambient light sensors or photo-sensitive devices 72 are positioned proximate to the wall 46 of the funnel portion 40. The photo-sensitive devices 72 are mounted in the stalk-like members for purposes of positioning. Other means of mounting the photo-sensitive devices 72 may be utilized to achieve the present invention. Because the material in the body portion 24 and the funnel portion 40 is capable of transmitting light, the photo-sensitive devices 72 are capable of receiving ambient light passing therethrough. When the body portions 24 are filled with material the photo-sensitive devices 72 will not receive light. However, when the level in the hopper assemblies 22 drops below the position of the photo-sensitive devices 72, the devices sense that a "low-level" condition exists. The photo-sensitive devices 72 are connected to some form of display or read-out or other device which will indicate to an operator of the material delivery apparatus 20 that the low-level condition has arisen.

Figure 2:
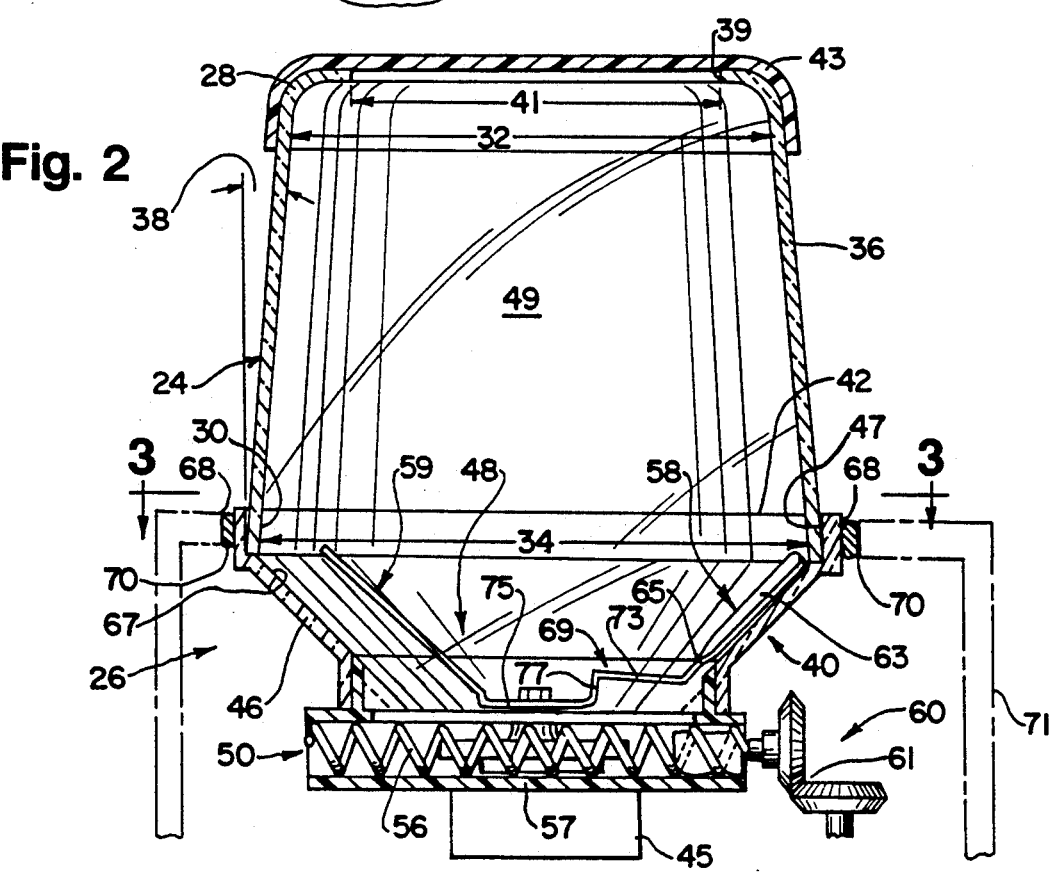
FIG. 2 is a partial fragmentary cross sectional front elevational view taken along line 2—2 in FIG. 1 through one of the body portions showing a conic angle of the frustoconical body portion and an agitating device with a wiping arm and a blending arm positioned inside the storage hopper assembly.

It is important to note that these photo-sensitive devices 72 do not require an active light-emitting source, but rather, use the ambient light which passes through the storage hopper assembly 22. Positioning the hopper assemblies 22 with the body portions 24 projecting upwardly through the housing 69 provides sufficient ambient light for the operation of the photo-sensitive devices 72. With reference to FIG. 2, the rotating arms 58 are positioned close to the inside surface of the wall 46 of the funnel portion 40 so as to more efficiently and thoroughly remove any material therefrom to assure material is removed from the inside surfaces to expose the corresponding photo-sensitive device 72.

In use, the hopper assemblies 22 are used in combination with a material delivery apparatus 20. Each of the hopper assemblies 22 is oriented so that a discharge chute 74 of the dispensing assembly 26 is oriented to dispose material, dispensed from the hopper 22, into a filling aperture 79 of the material delivery apparatus 20. The interlocking flange portions 64 on each of the hopper assemblies 22 retains the hopper assemblies 22 in the desired orientation.

In the position as shown in FIG. 1, the covers 43 are removed from the body portions 24 and material, such as coffee meal is deposited into the storage chamber 49 through the filling aperture 39. The storage chamber 49 is defined by the walls 36, 46 of the body portion 24 and the funnel 40.

Each time the hopper assembly 22 dispenses material from the storage chamber 49, the auger 56 rotates the agitating device 48 to agitate and stir the material therein. The combination of the ongoing agitation by the agitating device 48 and the frustoconical shape of the body portion 24 prevents any material in the storage chamber 49 from bridging or forming a dome over the dispensing assembly 26.

As material is dispensed from the storage hopper assemblies 22, the level of the material decreases. An additional advantage of the frustoconical shape of the body portion 24 is that the material tends to flow downwardly toward the middle of the exit port 44, thereby providing a more consistent material flow and even level in the storage chamber 49 as the material is used. The photo-sensitive devices 72 will detect a low-level condition when the material in the storage chamber 49 falls below a level at which the photo-sensitive devices 72 are exposed. As the material used to form the walls 36, 46 of the body portion 24 and the funnel portion 40 is a light-transmitting or transparent material, the storage hopper assembly 22 can sense a low-level condition using only ambient light. Therefore no active light source is needed in conjunction with the photo-sensitive devices 72.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A rotatable multiaction material agitating device for use with a material delivery apparatus, said material delivery apparatus including at least one hopper assembly for storing and dispensing ground material and means for rotating said agitating device operatively associated with said hopper assembly, said hopper assembly including a storage hopper in which ground material is retained prior to dispensing, and an inverted frustoconical funnel portion, said agitating device being disposed in said storage hopper and rotated by said rotating means for moving ground material stored in said storage hopper to prevent clogging and bridging of the ground material, said multiaction agitating device comprising:

a base segment operatively attached to said rotating means for rotating said agitating device in said hopper assembly;

a blending blade extending from said base segment, said blending blade being spaced away from an inside surface of said funnel portion; and a wiping blade extending from said base segment generally opposite said blending arm and being positioned in close proximity to said inside surface of said funnel portion opposite said blending arm for moving material retained in the storage hopper away from the inside surface of the storage hopper; said wiping blade being formed with a spiral twist, a leading edge of said wiping blade angled towards said inside surface of funnel portion, said spirally twisted wiping blade facilitating wiping action of said wiping blade against said inside surface of said funnel portion when ground material retained in said storage hopper presses said wiping blade against said inside surface of said funnel portion.

2. A rotatable multiaction material agitating device for use with a material delivery apparatus as recited in claim 1, further including a stepped portion on said wiping blade, said stepped portion including a vertical span extending from said base segment, a horizontal span extending from said vertical span, and a wiping span extending from said horizontal span said wiping span has a spiral twist for facilitating wiping action of said wiping blade against an inside surface of said storage hopper when ground material retained in said storage hopper presses against said wiping blade.

3. A material delivery apparatus including at least one storage hopper for storing and dispensing ground material, an inverted frustoconical funnel portion disposed at a bottom end of said storage hopper, ground material being gravity fed into said funnel portion, means for dispensing communicating with said funnel portion for dispensing ground material from said storage hopper, a rotatable agitating device disposed in said funnel portion, and means for rotating said agitating device operatively associated with said agitating device, said agitating device being rotated by said rotating means for moving ground material stored in said storage hopper to prevent clogging and bridging of the ground material, said agitating device comprising:

a base segment operatively attached to said rotating means for rotating said agitating device in said storage hopper;

a blending blade extending from said base segment, said blending blade being spaced away from an inside surface of said funnel portion; and a wiping blade extending from said base segment positioned in close proximity to an inside surface of said funnel portion for moving material retained in the storage hopper away from the inside surface of the funnel portion; said wiping blade being formed with a spiral twist, said spirally twisted wiping blade facilitating wiping action of said wiping blade against an inside surface of said funnel portion when ground material retained in said storage hopper presses said wiping blade against said surface of said funnel portion.

4. A material delivery apparatus as recited in claim 3, further including a stepped portion on said wiping blade, said stepped portion including a vertical span extending from said base segment, a horizontal span extending from said vertical span, and a wiping span extending from said horizontal span said wiping span has a spiral twist for facilitating wiping action of said wiping blade against an inside surface of said storage hopper when ground material retained in said storage hopper presses against said wiping blade.

* * * * *